United States Patent
Kodat

(10) Patent No.: US 9,677,326 B2
(45) Date of Patent: Jun. 13, 2017

(54) SYSTEM AND METHOD FOR CONTROLLING ANIMAL'S EGRESS FROM A SECURE ENCLOSURE

(71) Applicant: Tom Kodat, Clemmons, NC (US)

(72) Inventor: Tom Kodat, Clemmons, NC (US)

(*) Notice: Subject to any disclaimer, the term of this patent is extended or adjusted under 35 U.S.C. 154(b) by 0 days.

(21) Appl. No.: 13/896,466

(22) Filed: May 17, 2013

(65) Prior Publication Data

US 2013/0247834 A1 Sep. 26, 2013

Related U.S. Application Data

(62) Division of application No. 12/228,242, filed on Aug. 11, 2008, now Pat. No. 8,464,663.

(60) Provisional application No. 60/956,604, filed on Aug. 17, 2007.

(51) Int. Cl.
*A01K 15/02* (2006.01)
*E06B 7/32* (2006.01)

(52) U.S. Cl.
CPC ............ *E06B 7/32* (2013.01); *A01K 15/02* (2013.01)

(58) Field of Classification Search
CPC ........ A01K 15/02; A01K 1/035; A01K 1/033; E06B 7/32
USPC ....... 119/712, 718, 719, 720, 721, 905, 908, 119/484, 856, 858, 859, 840; 340/573.3, 340/573.4, 572.1, 686.1, 573.1, 686.6, 340/506, 628; 49/169
See application file for complete search history.

(56) References Cited

U.S. PATENT DOCUMENTS

| | | | |
|---|---|---|---|
| 4,216,743 A | 8/1980 | Cohen | |
| 5,628,284 A * | 5/1997 | Sheen et al. | 119/840 |
| 5,642,092 A * | 6/1997 | Dunne et al. | 340/326 |
| 5,769,032 A * | 6/1998 | Yarnall et al. | 119/721 |
| 5,872,516 A | 2/1999 | Bonge, Jr. | |
| 6,944,990 B2 | 9/2005 | Noyes | |
| 6,966,147 B2 | 11/2005 | Solowiej | |
| 2005/0161000 A1* | 7/2005 | Noyes | E06B 7/32 119/484 |
| 2005/0252622 A1 | 11/2005 | Reid | |
| 2006/0102101 A1* | 5/2006 | Kim | 119/720 |
| 2008/0036594 A1* | 2/2008 | Kates | 340/541 |

* cited by examiner

*Primary Examiner* — Trinh Nguyen
(74) *Attorney, Agent, or Firm* — James Ray & Assoc. LLC

(57) ABSTRACT

A system for controlling escape of pets during emergency, such as a fire, smoke, gas or odor emission, includes a passageway from the inside of the enclosure to the outside thereof. The passageway is normally closed by a door and an apparatus is provided for enabling opening of such door during emergency. A pre-recorded message urges the pet or pets to the open passageway only when the alarm device annunciating such emergency is intermittently disabled. A control apparatus is also provided for enabling passage of the pet or pets through the passageway and annunciates location of the pet or pets with respect to interior or exterior of the enclosure. A method is disclosed for remote operation of the controlled pet door to enhance safety of the pet owner attempting to enter residential dwelling.

17 Claims, 4 Drawing Sheets

SYSTEM AND METHOD FOR CONTROLLING ANIMAL'S EGRESS FROM A SECURE ENCLOSURE

CROSS-REFERENCE TO RELATED APPLICATIONS

This application is related to and claims priority from Provisional Patent Application Ser. No. 60/956,604 filed on Aug. 17, 2007. This application is a divisional of a prior non provisional application Ser. No. 12/228,242, filed Aug. 11, 2008.

FIELD OF THE INVENTION

The present invention relates, in general, to animal control and monitoring and, more particularly, this invention relates to a system and method for controlling domestic pet's egress from a secured enclosure during smoke or odor emitting emergencies and, yet particularly, the instant invention relates to a method of enhancing safety of a pet owner attempting to enter a residential dwelling.

BACKGROUND OF THE INVENTION

As is generally well known, pets are in great danger when they are left alone without a way to exit the house in the event of an emergency, such as a house fire or exposure to high levels of carbon monoxide. Without a safe means of existing the home during such event, the animal can be severely injured or die.

Prior to the conception and development of the present invention efforts have been made to alleviate dangers posed to the pet left alone within a secured dwelling during an emergency.

For example, U.S. Pat. No. 5,651,331 issued to Cleri, Jr. discloses an escape device for pets including a passageway opening from the inside of the enclosure to the outside thereof. The passageway is normally closed by a primary door and an apparatus is provided for opening such door at the onset of a smoke emitting emergency, such as a fire, such that the door is open for safe egress for the pet or pets. In addition, a pre-recorded message preferably in the owner's voice directing and/or commanding the pet or pets to the open passageway is provided. However, the Cleri's invention is limited to the pets situated in close proximity to the primary door as the message is played while the fire alarm is continuously on.

U.S. Pat. No. 6,297,739 issued to Small, U.S. Pat. No. 5,872,516 issued to Bonge, Jr., U.S. Pat. No. 5,642,092 issued to Dunne et al., and U.S. Pat. No. 6,966,147 issued to Solowiej disclose various types of powered pet doors and system enabling passage of the pet through the opening covered by the pet door when predetermined conditions are met.

However, it has been found that there is a need for an improved control apparatus enabling egress of the pet during an emergency event.

It has been further found desirable to annunciate location of the pet in respect to the interior or exterior of the dwelling equipped with a power driven or lockable pet door.

It has been additionally found desirable to remotely control power driven or lockable pet door so as to enhance safety of the pet owner attempting to enter the dwelling containing pet therewithin.

SUMMARY OF THE INVENTION

In accordance with one embodiment, the invention provides a system for controlling egress of at least one pet from a secured enclosure to outside environment thereof upon an occurrence of at least one of smoke, fire, gas and odor hazard emitting emergencies. The system includes an aperture formed in a predetermined portion of such enclosure and sized to accommodate passage of selected pets therethrough. A pet door is provided and is movably attached to such predetermined portion of such enclosure for movement between open and closed positions. There is means for securing the pet door in the closed position and enabling movement of the pet door to the open position upon receipt of a control signal so that such at least one pet is free to pass through the aperture to such outside environment. A hazard detection sensor is also provided and is operatively connected with the pet door movement enabling means and providing the control signal upon sensing the hazard. There is also means for providing an audible hazard annunciation at predetermined intervals upon the hazard detection sensor sensing the hazard. Means is provided for playing a pre-recorded audible voice message during at least one predetermined interval to urge such at least one pet towards and through the aperture, so that the message is audible to such at least one pet located in a position remote from the aperture. A power source is capable of supplying operating power to at least the pet door movement enabling means.

In accordance with another embodiment of the invention, therein is provided a control apparatus which is connected to the pet door securing and movement enabling means. The pet door is mounted for movement between open and closed positions. There is also means for securing the pet door in the closed position and enabling movement thereof to the open position upon receipt of a control signal from the control apparatus. Receipt of the control signal enables free passage of the at least one pet through the aperture. The control apparatus includes means for providing at least one pet identification signal, means for generating the control signal upon receipt of the at least one pet identification signal and means for indicating location of the at least one pet with respect to internal or external surface of the pet door.

In accordance with yet another embodiment, the invention provides a method for enhancing safety of a pet owner attempting to enter a residential dwelling. The method includes the step of forming an aperture in a predetermined portion of the dwelling sized to accommodate passage of at least one pet therethrough. Then, mounting a pet door for movement between open and closed positions. Next, mounting means adjacent the pet door for securing the pet door in the closed position and enabling movement thereof to the open position upon receipt of a control signal thus enabling free passage of the at least one pet through the aperture. Mounting means for playing a pre-recorded audible voice message upon receipt of the control signal. Then, providing the pet owner with a remote control device capable of transmitting the control signal. Next, transmitting, by the pet owner with the remote control device, the control signal when the pet owner is located in a predetermined proximity to the dwelling. Activating, with the control signal, the means for playing the pre-recorded audible voice message. Next, enabling, with the control signal, movement of the pet door to the open position. Then, urging, with the pre-recorded audible voice message, the at least one pet towards and through the aperture. Waiting, by the pet owner, at least egress of the at least one pet through the aperture. Finally, entering, by the pet owner, the dwelling in a presence of the at least one pet.

OBJECTS OF THE INVENTION

It is, therefore, one of the primary objects of the present invention to provide a control apparatus for controlling egress of a pet from a secured enclosure during fire, smoke, gas or odor emitting emergencies.

Another object of the present invention is to provide a control apparatus for controlling egress of a pet from a secured enclosure during fire, smoke, gas or odor emitting emergencies that plays a pre-recorded message while intermittently disabling the emergency annunciating alarm.

Yet another object of the present invention is to provide a control apparatus for controlling passage of a selected pet through a passageway secured with a power driven or lockable pet door.

A further object of the present invention is to provide a control apparatus for enabling passage of a pet through a passageway secured with a power driven or lockable pet door that is capable of annunciating location of the pet with respect to interior or exterior surface of the dwelling.

Yet a further object of the present invention is to provide a control apparatus for enabling passage of a pet through a passageway secured with a power driven or lockable pet door that is capable of annunciating location of the pet with respect to interior or exterior surface of the dwelling by way of at least one light emitting device.

An additional object of the present invention is to provide a method for enhancing safety of a pet owner attempting to enter a residential dwelling.

Another object of the present invention is to provide a method for enhancing safety of a pet owner attempting to enter a residential dwelling wherein the pet owner can remotely control power driven or lockable pet door and enable egress of the pet therethrough.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
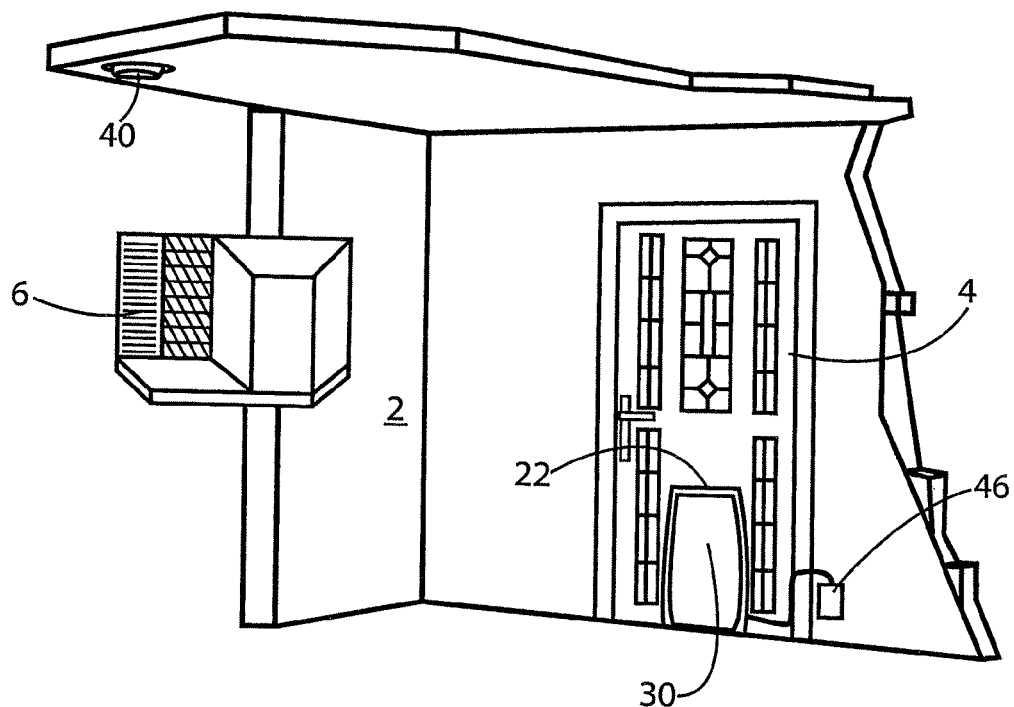
FIG. 1 is an isometric view of a system for controlling pet's egress from a secured enclosure constructed in accordance with one embodiment of the invention.

Prior to proceeding to the more detailed description of the present invention, it should be noted that, for the sake of clarity and understanding, identical components which have identical functions have been identified with identical reference numerals throughout the several views illustrated in the drawing figures.

The best mode for carrying out the invention is presented in terms of its presently described embodiments, herein depicted within FIGS. 1 through 6. However, the invention is not limited to the described embodiments, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only several particular configurations shall be shown and described for purposes of clarity and disclosure and not by way of limitation of scope.

In accordance with one embodiment, the invention provides a system for controlling egress of a pet or pets from an enclosure to outside environment thereof upon an occurrence of at least one of fire, smoke, gas and odor hazard emitting emergencies.

Figure 2:
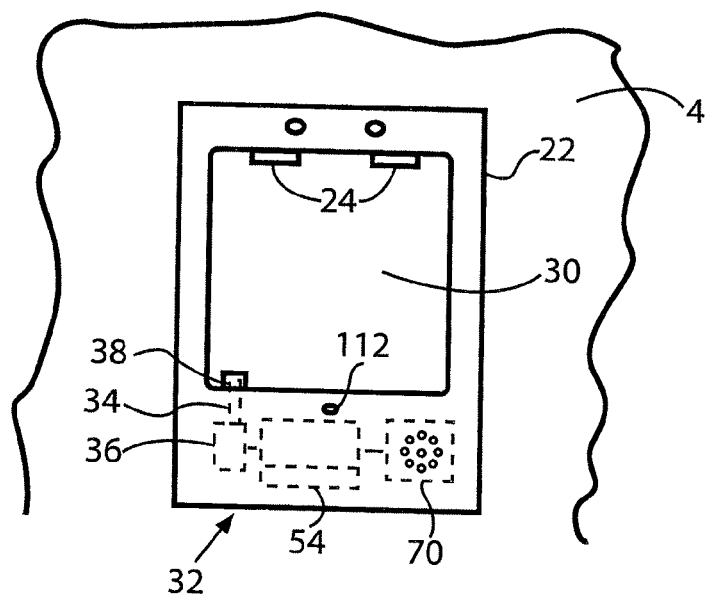
FIG. 2 is a partial elevation view of the system of FIG. 1, particularly illustrating arrangement for securing and controlling a pet door.
Figure 3:
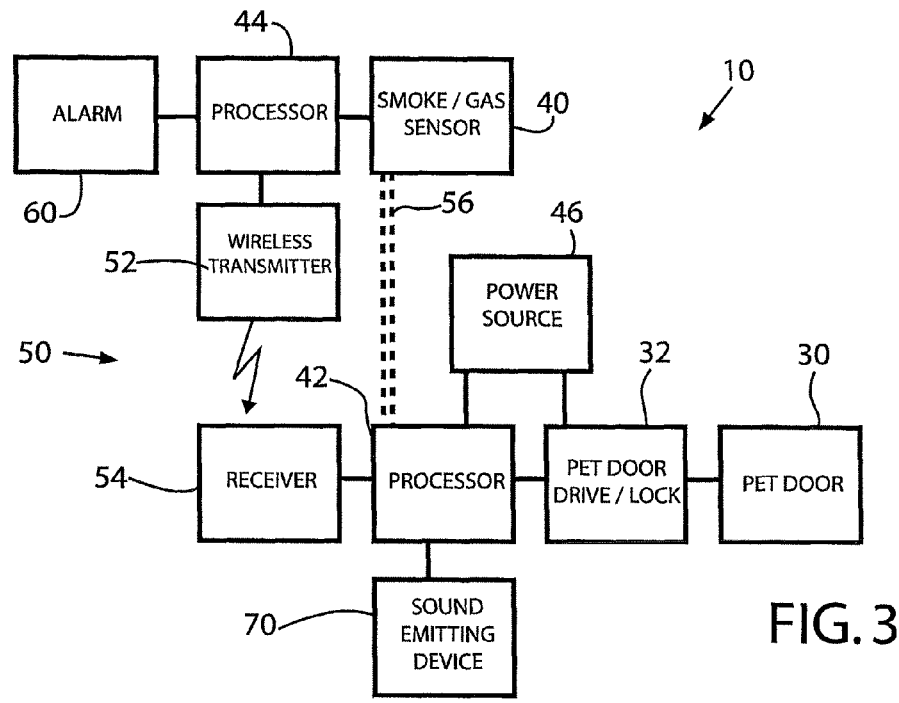
FIG. 3 is a block diagram of the system of FIG. 1.

Now in reference to FIGS. 1-3, the system 10 includes an aperture 20 formed in a predetermined portion of an enclosure 2. Such enclosure 2 is illustrated in FIG. 1 as a residential dwelling but could be of any other type. For example, the dwelling 2 can be an animal shelter or any other enclosure permanently or temporarily housing pets or animals.

Such aperture 20 may be formed in a conventional door 4 of the enclosure 2 or may be provided within a window 6 as disclosed in U.S. Pat. No. 6,944,990, whose teachings are incorporated into this document by reference thereto. As is conventional, the aperture 20 is sized to accommodate passage of selected pets 8 therethrough.

The system 10 further includes a pet door 30 that is movably attached to a predetermined portion of such enclosure 2 for movement between open and closed positions and for covering the aperture 20 in normal closed position.

The system 10 additionally includes means 32, preferably mounted within a portion of the pet door frame 22, for securing the pet door 30 in the closed position and for enabling movement thereof to the open position upon receipt of a control signal, thus enabling free egress of such at least one pet 8 through the aperture 20 to such outside environment. Such means 32 may be of any presently used systems. By way of one example, such means may be of the type as taught in the incorporated-by-reference U.S. Pat. No. 5,651,331 that includes a powered drive, such as an electric motor and a cord connected to the pet door 30, so that the motor winds the cord and moves the pet door in a linear vertical direction to expose the aperture. By way of another example of FIGS. 2-3, such means 32 may include the door 30 being hingeably attached to a pet door frame 22 by way of hinges 24 and further include a lock plunger 34 operable by an electric solenoid 36 and normally biased for engagement with a bore 38 formed in the pet door 30. When solenoid 36 is energized upon receipt of the control signal, the lock plunger 34 withdraws from the bore 38 enabling the pet 8 to simply push the pet door 30 which then pivots about hinges 24. When the solenoid 36 is deenergized, preferably during pet door 30 being in a normal closed position to minimize electrical energy consumption, the lock plunger 34 re-engages bore 38 thus preventing movement of the pet door 30. Alternatively to the bore, 38, the lock plunger may be equipped with a bifurcated end (not shown) to simply cage the edge portion of the pet door 30.

Another essential component of the present invention is a hazard detection sensor 40 operatively connected with the pet door movement enabling means and providing the control signal upon sensing the hazard. Such hazard detection sensor 40 is at least one of a smoke gas and odor detector. The hazard detection sensor 40 may be positioned remotely from the pet door 30, as best shown in FIG. 1, wherein the system 10 further includes means, generally designated as 50, for transmitting the control signal from the hazard detector sensor 40 and receiving such signal at the microprocessor based controller 42 mounted within the pet door frame 22 and operatively connected to the door movement enabling means 32, for example such as solenoid 36 of FIG. 2.

The means 50 for transmitting and receiving the control signal may be of a wireless type employing conventional combination of transmitter 52 mounted integral or coupled to the hazard detection sensor 40 and a receiver 54 mounted integral or coupled to the processor 42. A second processor 44 would be then also provided in combination with the hazard detection sensor 40. As is also conventional the transmitter 52 and the receiver 52 may be selected from the group consisting of radio frequency, ultrasonic and infrared transmission devices.

The present invention contemplates that functions of at least the microprocessor 42 and receiver 54 can be combined by a ZigBee type wireless microcontroller manufactured for example by Jennic Ltd of Sheffield, UK.

It is also within the scope of the present invention to position the hazard detection sensor 40 in close proximity to or disposed integral within the pet door movement enabling means and couple thereto by way of simple wire connection 56.

The power source 46 may be a well known power converter for example converting a conventional 110/220 VAC power into operating 12/24 VDC power. The power source may be also at least one battery or rechargeable or non-rechargeable type.

The present invention also provides means, such as an audible alarm 60, for providing an audible hazard annunciation upon the hazard detection sensor 40 sensing the hazard and operable at predetermined intervals.

The final essential component of this embodiment, is means 70 for playing a pre-recorded audible voice message during at least one predetermined interval when the audible hazard annunciation is disabled to urge such at least one pet 8 towards and through the aperture 20, so that the message is audible to such at least one pet 8 in a position remote from the pet door 30. Such means 70 may be of the type as disclosed in incorporated-by-reference U.S. Pat. No. 5,651,331.

The criticality of playing a pre-recorded audible voice message during at least one interval when the audible hazard annunciation device 60 is intermittently disabled is to allow issuance of a clear and non-obstructed command to the at least one pet 8. Thus, such at least one pet 8 may be located in a location which is remote to the pet door 30 and still be able to hear the voice command. It is common that the pet 8 may be scared upon hearing audible hazard annunciation and hide in a remote portion of the enclosure 2. Thus, the pet or pets 8 may not hear the voice command played at the pet door 30. In the present invention, it would be appreciated that since the voice command is played while the audible hazard annunciation is intermittently disabled, the pet 8 can clearly hear and recognize the voice command urging the pet towards the pet door 30 and through the aperture 20 even when the pet is hiding in the remote portion of the enclosure 2.

It will be also appreciated that the microprocessor controller 42 and 44 will be programmed to synchronize operation of the alarm 60 and voice message playing means 70.

Figure 5:
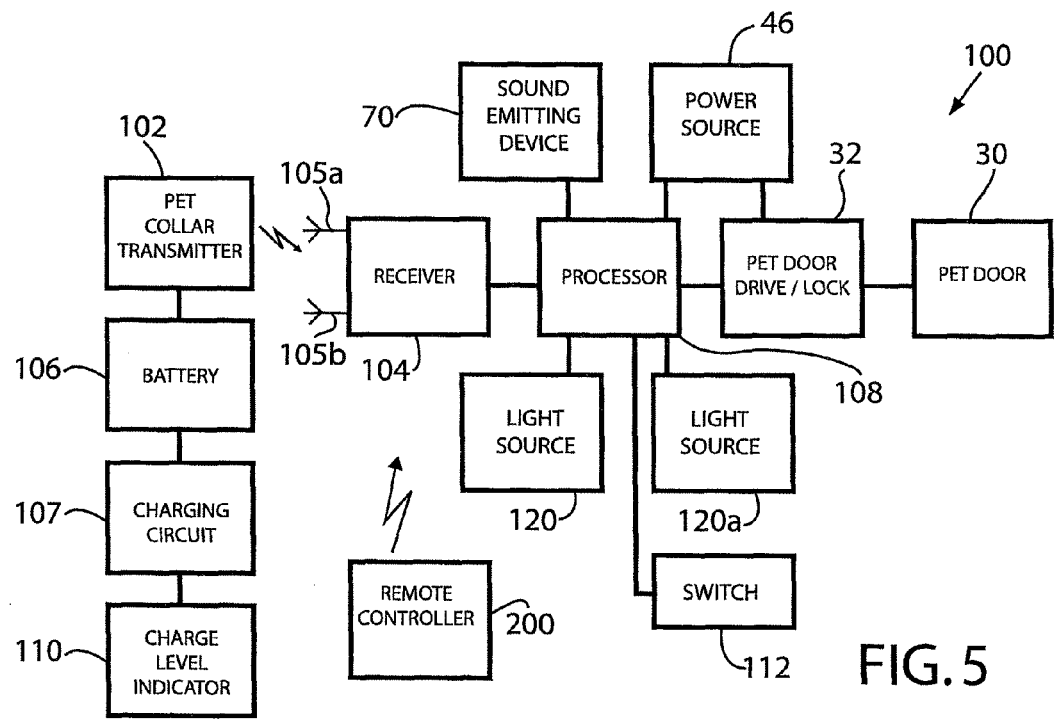
FIG. 5 is a block diagram of the system of FIGS. 4a-4b.
Figure 4A:
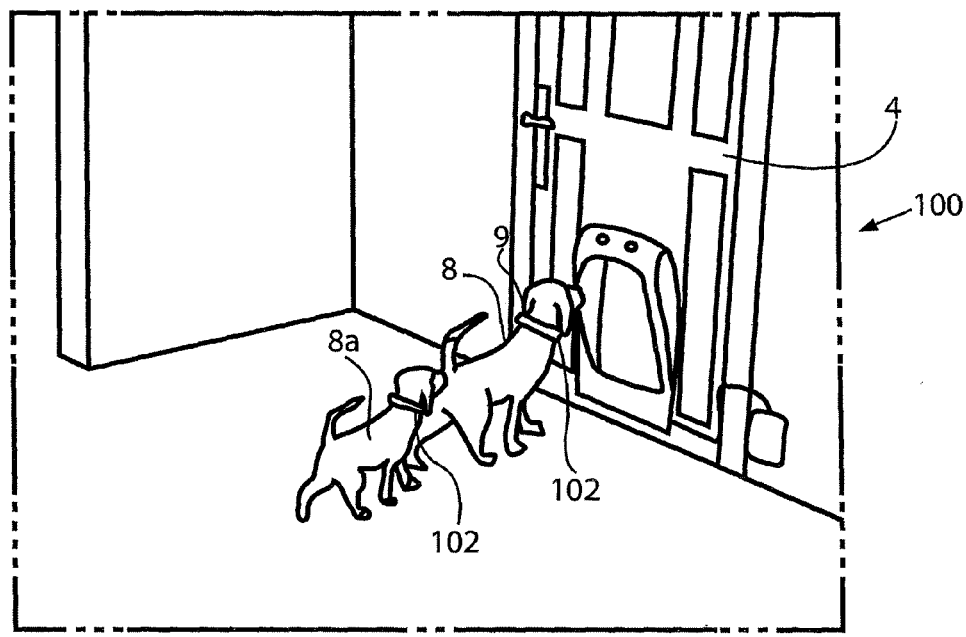
FIGS. 4a-4b illustrate a system for controlling domestic pet's egress from and ingress into a secured enclosure constructed in accordance with another embodiment of the invention.
Figure 4B:
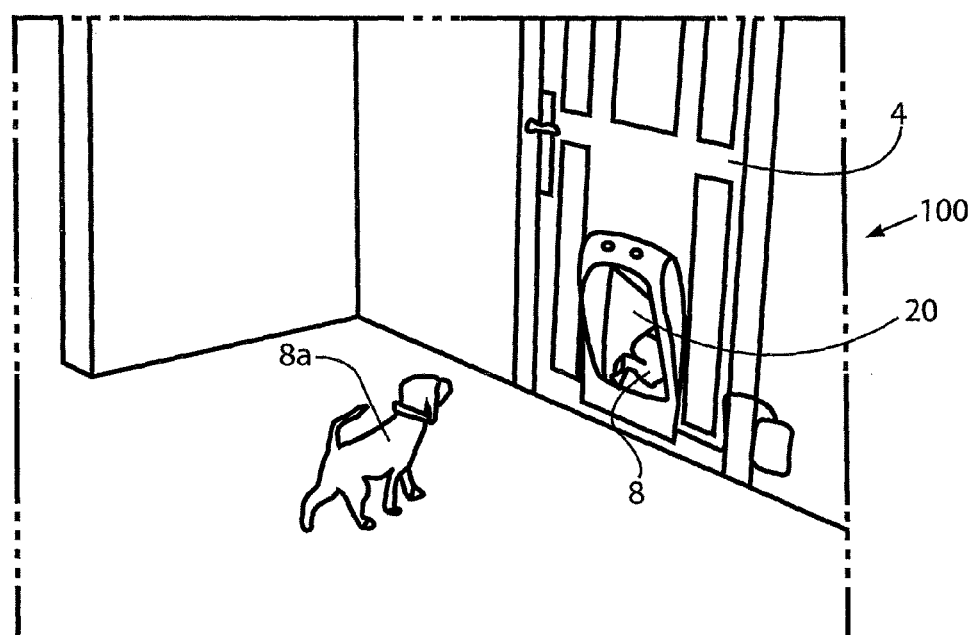

In accordance with another embodiment of FIGS. 4a, 4b and 5, the present invention provides a control apparatus, generally designated as 100, which is used in combination with a pet door 30 closing an aperture 20 sized to accommodate passage of at least one pet therethrough. Pet door 30 is mounted for movement between open and closed positions. Means 32 is provided for securing the pet door 30 in the closed position and enabling movement thereof to the open position upon receipt of a control signal thus enabling free passage of the at least one pet 8 through the aperture 20.

The control apparatus 100 includes means for providing at least one pet identification signal. Preferably, such means includes a transmitter 102 mounted within a collar 9 of the at least one pet 8 and a receiver 104 mounted in a predetermined position with respect to the pet door 30 and capable of receiving the at least one pet identification signal. In accordance with a presently preferred embodiment of the invention, the transmitter 102 is a passive radio frequency identification tag and wherein the receiver 104 is a radio frequency identification reader. The receiver 104 is advantageously mounted within the pet door frame 22 and is operatively coupled to a conventional microprocessor based controller 108. Advantageously, the transmitter 102 being a passive radio frequency identification tag does not require batteries or other power supply sources. The receiver 104 may be equipped with a pair of antennas 105a and 105b with one antenna used to allow egress of the at least one pet 8 and with another antenna being used to allow ingress thereof.

Alternatively, the transmitter 102 may be of an active transmitting type coupled to at least one battery 106 disposed within the collar 9. It is within the scope of the present invention to provide such at least one battery 106 of a rechargeable type and further provide a battery charging circuit 107 also disposed within the collar 9 for recharging such rechargeable battery 106. It has been found advantageous to monitor charge levels of the battery 106 so as to substantially eliminate conditions wherein the transmitter 102 is inoperative due to discharged battery. Accordingly, the control apparatus 100 further includes means 110 for annunciating at least one charge condition of the at least one battery 106. Such, means 110 may be a light emitting diode (LED) illuminated when the charge level of the battery 106 is below a predetermined threshold limit. Alternatively, means 110 may be employed directly with the battery 106 of a non-rechargeable type to indicate the need for its replacement.

It is also within the scope of the present invention to employ transmitters and receivers operating in the art of infra red or ultrasound transmissions.

The microprocessor based controller 108 is also employed for generating the control signal upon receipt of the at least one pet identification signal. It is further preferred to equip such controller 108 with the capability to recognize more than one pet identification signal, each associated with a distinct code, and provide programmable logic means for enabling the pet owner of programming the desired distinct code(s). This will enable the owner of plurality of pets 8 to control passage of some or all pets 8 through the aperture 20, as best shown in FIGS. 4a-4b, wherein the pet 8 has been allowed to pass through aperture 20, while passage of the pet 8a, has been prevented.

The control apparatus 100 also includes means for indicating location of the at least one pet 8 in respect to interior or exterior of the enclosure 2. Such means for indicating location of the at least one pet 8 preferably includes a light emitting source 120. By way of an example only, this light emitting source 120 illuminates when the at least one pet 8 passed through the aperture 30 and is located external to the enclosure 2. It is also within the scope of the present invention to provide a pair of light emitting sources, with the first light emitting source 120 being illuminated when the at least one pet 8 is located internal to the dwelling 2 and with the other light emitting source 120a being illuminated when the at least one pet 8 is located external to the dwelling 2. The light emitting sources, for example such as a well known light emitting diode (LED), may be provided in distinct collars or may be provided in a dual color arrangement, for example, such as a green and red combination. Thus, the light emitting source 120 provided for the purpose of indicating location of the at least one pet 8 internal to the dwelling 2 will emit green color in normal conditions and will switch to emit red color when the at least one pet 8 is located external to the dwelling 2. The operational logic of the second light emitting source 120a will be opposite to the operational logic of the first light emitting source 120. The advantage of providing a pair of light emitting sources 120, 120a, particularly of a dual color design, is in the ease of determining failure of one of such light emitting source 120, 120a.

It is also within the scope of the present invention to provide a switch 112 manually operated by the pet owner to activate the sound emitting device 70 for the purpose of gaining attention of at least one pet 8 currently located external to the dwelling 2 and further for the purpose of calling such at least one pet 8 to come inside of the dwelling 2. It would be appreciated that the door frame 22 would be adapted to allow sound emission external to the dwelling 2.

Figure 6:
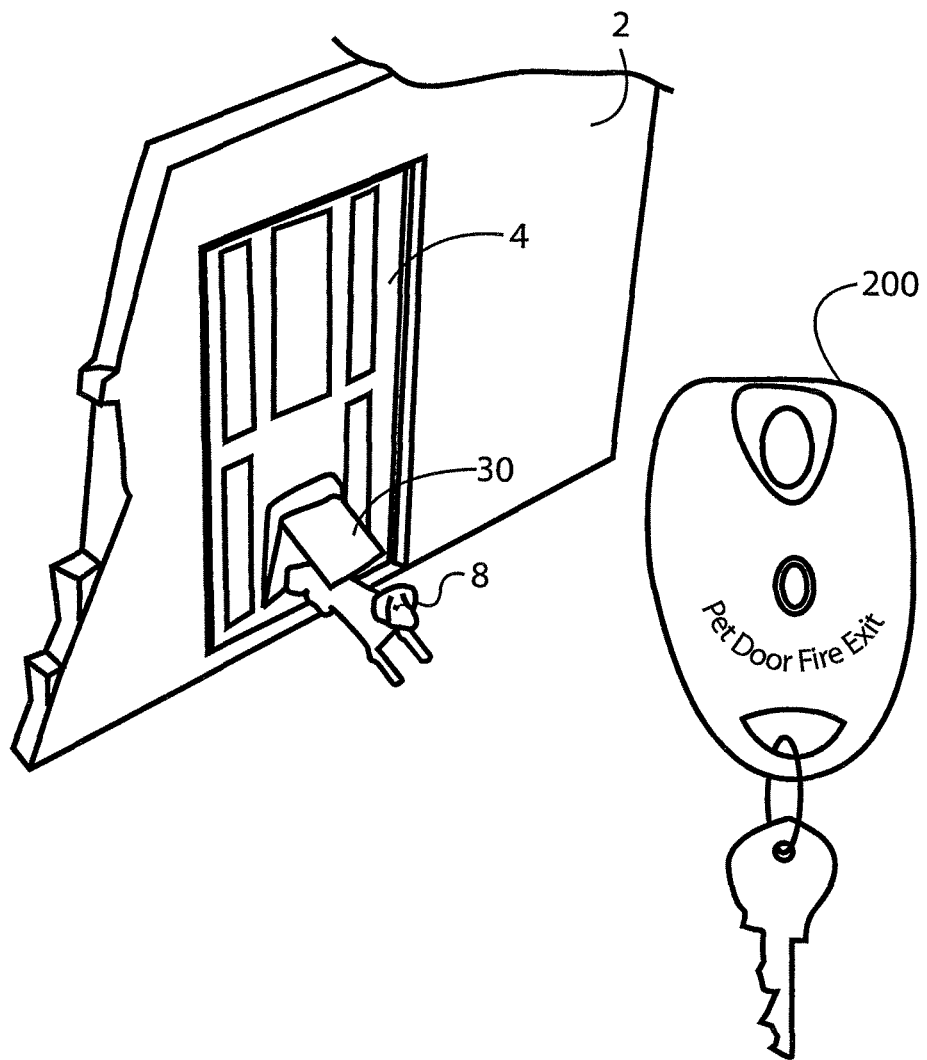
FIG. 6 is an isometric view of a system for controlling domestic pet's egress from a secured enclosure constructed in accordance with yet another embodiment of the invention.

In accordance with yet another embodiment of FIGS. 5-6, the invention provides a method for enhancing safety of a pet owner attempting to enter a residential dwelling 2, particularly during darkness or nightfall. The method includes the step of forming an aperture 20 in a predetermined portion of the dwelling 2 sized to accommodate passage of at least one pet 8 therethrough. Then, mounting a pet door 30 for movement between open and closed positions. Next, mounting means 32 adjacent the pet door 30 for securing the pet door 30 in the closed position and enabling movement thereof to the open position upon receipt of a control signal thus enabling free passage of the at least one pet 8 through the aperture 20. Mounting means 70 for playing a pre-recorded audible voice message upon receipt of the control signal. Then, providing the pet owner with a remote control device 200 capable of transmitting the control signal. Such control device 200 may be a well known hand held controller or a key fob capable of transmitting, for example, a radio frequency signal or any other conventional signal type. When the pet owner (not shown) approaches the dwelling 2, for example, parking a vehicle (not shown) on the driveway (not shown), the pet owner can then transmit the control signal without leaving the safety of the car confines. Thus, the method further includes the step of transmitting, by the pet owner with the remote control device 200, the control signal when the pet owner is located in a predetermined proximity to the dwelling 2. Next, transmitted control signal enables movement of the pet door 30 and also activating the means for playing pre-recorded audible voice message. The at least one pet 8 is urged, with the pre-recorded audible voice message, towards and through the aperture 20. Thus, the pet owner can wait for the at least one pet 8 to at least egress through the aperture 20 and preferably come to the vehicle (not shown). Finally, the pet owner can safely enter the dwelling 2 accompanied by the pet 8.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. A control apparatus for an aperture formed in an enclosure and sized to accommodate passage of at least one pet therethrough, a pet door frame surrounding said aperture and a pet door hinged at an upper edge thereof to said pet door frame for movement between open and closed positions, said control apparatus comprising:
    a bore in a lower edge of the pet door;
    an electric solenoid mounted within the pet door frame below the aperture, said electric solenoid comprising a lock plunger being biased for an engagement with the said bore to secure the pet door in the closed position, said electric solenoid being selectively energized, during use of said control apparatus, to disengage said plunger from said engagement with said bore of the pet door to enable movement of the pet door to the open position upon receipt of a control signal so that the at least one pet is free to pass through the aperture between an interior of the enclosure and an outside environment;
    a transmitter mounted within a collar of the at least one pet, said transmitter providing a pet identification signal with a distinct code;
    a receiver mounted within the pet door frame and configured to receive said pet identification signal; and
    a controller coupled to said receiver, said controller generating said control signal when said distinct code in said received pet identification signal matches a programmed code within said controller.

2. The control apparatus, according to claim 1, wherein said transmitter is a passive radio frequency identification tag and wherein said receiver is a radio frequency identification tag reader.

3. The control apparatus, according to claim 1, wherein said controller includes a pair of antennas coupled to said receiver, wherein one of said pair of antennas receives said pet identification signal from said at least one pet located within the interior and wherein another one of said pair of antennas receives said pet identification signal from said at least one pet located within the outside environment.

4. The control apparatus, according to claim 1, wherein said transmitter is coupled to at least one battery disposed within said collar.

5. The control apparatus, according to claim 4, wherein said controller further includes means for annunciating at least one charge condition of said at least one battery.

6. The control apparatus, according to claim 1, wherein said control apparatus includes a sound emitting device and a switch mounted below the aperture, said switch manually operable by a pet owner to activate said sound emitting device, said activated sound emitting device emitting at least one message audible to the at least one pet located within the outside environment external to the dwelling.

7. The control apparatus of claim 1, further comprising means for indicating a location of said at least one pet with respect to the interior or the outside environment of the enclosure.

8. The control apparatus, according to claim 7, wherein said means for indicating location of said at least one pet includes at least one light emitting source.

9. The control apparatus, according to claim 7, wherein said means for indicating said location of the at least one pet includes a pair of light emitting sources, one of said pair of light emitting sources is illuminated when the at least one pet is located within the interior and another one of said pair of light emitting sources is illuminated when the at least one pet is located within the outside environment.

10. The control apparatus, according to claim 7, wherein said means for indicating said location of the at least one pet includes a pair of bi-color light emitting sources, one of said pair of light emitting sources emits a first color when the at least one pet is located within the interior and another one of said pair of light emitting source emits said first color when the at least one pet is located within the outside environment.

11. The control apparatus of claim 1, wherein the enclosure is a residential dwelling, wherein said control apparatus further comprises a control device operable by an owner of the at least one pet remotely from the pet door and wherein said control apparatus is configured to enhance safety of the pet owner attempting to enter the residential dwelling.

12. The control apparatus of claim 11, wherein said control device is configured to transmit said at least one pet identification signal enabling movement of the pet door and is further configured to audibly emit a voice message, said voice message urging the at least one pet towards and through the aperture.

13. A control apparatus for an aperture formed in an enclosure and sized to accommodate passage of at least one pet therethrough and a pet door mounted for a movement between open and closed positions, said control apparatus comprising:
  a pet door frame configured to surround the aperture and being attached to a surface of the enclosure, the pet door being hinged to said pet door frame; and
  a lock plunger biased for engagement with a bore in a lower edge of the pet door and an electric solenoid connected to said lock plunger and selectively energized, during use of said control apparatus, to disengage said lock plunger from said bore in the pet door, whereby said lock plunger and said electric solenoid are mounted within the pet door frame below the aperture and configured to secure the pet door in said closed position and enabling movement of the pet door to said open position upon receipt of a control signal so that the at least one pet is free to pass through said aperture to the outside environment; and
  a controller generating said control signal.

14. The control apparatus of claim 13, further comprising:
  a transmitter mounted within a collar of said at least one pet and configured to transmit a pet identification signal with a distinct code;
  a receiver mounted within said pet door frame and configured to receive at least one pet identification signal; and
  said controller being programmable to store codes and configured to generate said control signal when said distinct code in said received pet identification signal matches a programmed code within said controller.

15. The control apparatus of claim 14, further comprising said pet door.

16. The control apparatus, according to claim 14, wherein said receiver is configured to receive a plurality of pet identification signals, each of said plurality of pet identification signals identifies, through said distinct code, a distinct pet and wherein said control apparatus enables passage of only pre-selected pets.

17. The control apparatus of claim 14, further comprising:
  (a) a hazard detection sensor configured to provide said control signal upon sensing an occurrence of a hazard emitting emergency;
  (b) means for providing an audible hazard annunciation at predetermined intervals upon said hazard emitting emergency sensing; and
  (c) means for playing a pre-recorded audible voice message during at least one predetermined interval to urge at least one pet towards and through the aperture, so that said message is audible to the at least one pet located in a position remote from the aperture.

\* \* \* \* \*